May 12, 1959  R. L. SNYDER  2,886,790
SATURABLE REACTANCE FLIP-FLOP DEVICE
Filed Aug. 24, 1955

INVENTOR.
RICHARD L. SNYDER
BY
*Alfred W. Barber*
ATTORNEY

United States Patent Office 2,886,790
Patented May 12, 1959

2,886,790

SATURABLE REACTANCE FLIP-FLOP DEVICE

Richard L. Snyder, Moorestown, N.J.

Application August 24, 1955, Serial No. 530,253

2 Claims. (Cl. 336—155)

The present invention concerns saturable reactor devices and, in particular, bi-stable saturable reactors suitable for use as flip-flops at very high speeds.

In many information handling systems, particularly those of the digital types, numerous bi-stable devices called "flip-flops" are used to maintain certain conditions whose establishment must be initialed by an electrical impulse of very brief duration. These flip-flops are commonly composed of regeneratively connected pairs of vacuum tube triodes, transistors or, in low speed applications, relays. What may be called infinite regeneration is used in these circuits so that if one element of the pair is conducting, the other is driven to such a non-conducting state that recovery which might cause oscillation is impossible. Hence, when one of the two stable conditions is established, it can only be reversed by the deliberate introduction of a signal of sufficient energy to cause such reversal.

According to the present invention a small annulus of hard magnetic material such as a hard ferrite is used. A sector of the annulus is cut-out and a piece of soft ferrite material is inserted. A signal winding comprising a balanced winding is wound around a small hole in the soft material in such a direction that flux caused by current in the coil circulates around the small hole. High frequency currents are passed through the signal coil which has a relatively high impedance and hence passes a relatively small current to its load when the soft material is unsaturated and at maximum permeability. A control winding is wound around the body of the annulus. A control signal or pulse is sent through this control coil to fully magnetize or saturate the body of the annulus and at the same time to saturate the soft core of the signal winding. When the core of the signal winding is saturated, its impedance drops to a low value allowing an increased signal to reach the load. The retentivity of the hard material of the annulus body should be high enough so that even when the control signal or pulse is removed, the soft core of the signal winding is maintained in a saturated condition and the signal continues to appear across the load. Thus the two conditions which provide a flip-flop circuit are provided, one when the hard material of the annulus is demagnetized and the other when the hard material is saturated or carrying its residual magnetism. In the first condition a small signal is passed on to the load and in the second condition a large signal. This flip-flop circuit may be returned to its first condition from its second condition by means of a reset winding which may be a balanced coil wound through a hole in the body of the annulus the two sections constituting the sides of the hole have essentially equal cross-sectional areas. Current passed through the reset coil produces a magnetic field around the hole through which it is wound and, because as much flux passes in one direction through the section of the core on one side of the hole as passes in the opposite direction through the other side, relative to the main body of the ring, zero flux is established in the main body of the ring. When current is removed these points of cancellation effectively interrupt the magnetic circuit around the annulus and through the soft core of the signal coil providing the first condition of the flip-flop circuit.

Accordingly objects of the present invention are to provide a simple flip-flop circuit which is inexpensive, reliable and non-critical and capable of extremely high speed operation.

Another object is to provide a flip-flop circuit which requires no control signal or power to maintain it in either of its stable conditions.

Still another object is to provide a flip-flop circuit having practically infinite life.

These and other objects of the present invention will be apparent from the detailed description of the invention given in connection with various figures of the drawing.

Figure 1:
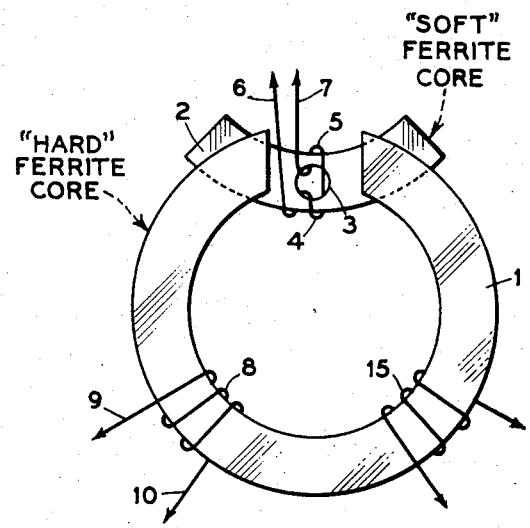
Fig. 1 shows one form of the present invention.

Fig. 1 shows an annulus of hard or semi-permanent magnet type ferrite material 1 with a section cut away and a piece of soft ferrite 2 inserted to complete the magnetic circuit of the annulus. The soft material may, for example be composed of ferrite having a maximum permeability of the order of four thousand, a saturation density of the order of thirty-four hundred gauss and a coercive force of the order of two tenths oersted while the hard material may be a ferrite material having a maximum permeability of the order of four thousand, a saturation density of the order of thirty-four hundred gauss, and a coercive force of the order of two oersteds. The important factors are the relative coercive forces which should have a ratio such that when magnetizing force is removed the one with the higher coercive force, i.e. the harder material, shall maintain saturation in the one with the lesser coercive force. Many commercial materials meet these requirements. A small hole 3 in the soft section 2 carries the signal coils 4 and 5 wound through the hole and around the inside and outside edges respectively of the soft section 2 in a manner to provide a balanced winding and a localized magnetic field encircling the hole 3. Balance is achieved by winding the same number of turns on coil 4 as on coil 5 and connecting the two coils together so that they aid each other in producing the encircling field. Around a section of the main body of the annulus is wound a control winding 8 and at another point a resetting winding 15.

In operation signals to be controlled are applied to the signal windings over leads 6 and 7. Control current is applied to coil 8 over leads 9 and 10. Assuming to start that the hard magnetic material of annulus 1 is demagnetized, then no magnetic flux will be passed through the soft core 2 and signal coil 4—5 will have maximum impedance due to maximum permeability of its core. When control current is passed through control coil 8 by applying control voltage to leads 9 and 10, hard core 1 is magnetized and magnetic flux is passed through soft core 2. If sufficient flux is passed through core 2, it will be saturated and its permeability and hence the impedance of coil 4–5 will be greatly reduced passing signal currents. If, the material of core 1 has sufficient retentivity, core 2 can be maintained in its saturated condition after control current is removed from coil 8 and current continues to pass through the signal coils 4 and 5. This may be considered the "on" condition and it is maintained without the application of any control energy. In order to return the circuit to its initial or "off" condition, current is passed through resetting coil 15 of sufficient magnitude to demagnetize core 1 and hence to remove all flux from core 2. Demagnetization occurs regardless of the polarity when the core sections on each side of the reset coil are driven to saturation by the reset coil.

Figure 2:
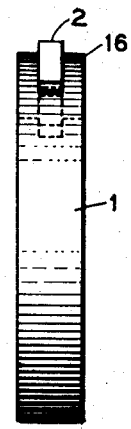
Fig. 2 shows a side view of the form of the invention shown in Fig. 1.

Fig. 2 shows a side view of the device of Fig. 1 showing how core 2 fits in a slot in core 1 in order to provide good magnetic coupling between the two cores.

Figure 3:
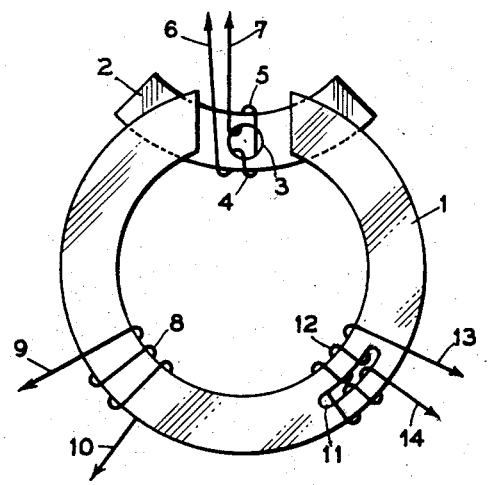
Fig. 3 shows a preferred form of the present invention.

Fig. 3 shows a form of the present invention including the ferrite annulus 1 with slots and cut-out to receive soft ferrite section 2, signal coils 4 and 5 wound through hole 3 in the soft section, and control winding 8. In this form the reset coil comprises a balanced winding 12 wound through a slot 11 in the hard annulus and terminating in leads 13 and 14. Coil 12 is wound half through the slot and around the outer edge of the annulus and half through the slot and around the inner edge of the annulus and the two halves are connected in series in such a manner as to provide a field encircling the slot. This construction of the reset coil and manner of coupling to hard ferrite annulus permits resetting without applying a critical amount of current. When the annulus has been magnetized by the control winding current, it may be demagnetized by applying current to the resetting coil. When current of at least a required minimum is applied to the resetting coil, a magnetic field is produced around the slot in which the resetting coil is wound. On one side of the slot this field opposes the residual magnetism of the annulus, and on the other side it aids. On the side where it aids the flux density will be driven to saturation, if saturation does not already exist. On the other side the initial flux will be driven to zero and then to saturation in the opposite sense. For example, if initially a total of 20 lines passed around the ring so that 10 lines passed on each side of the hole and if the reset current saturates the sides with 15 lines each, one side has an increase of flux from 10 to 15 lines or 5 lines, the other side has a change of flux from 10 lines in one direction to 15 lines in the opposite direction or a total of 25 lines so that the net change of flux is 25 lines in one direction minus 5 lines in the opposite direction or 20 lines to reduce the body lines also initially 20 lines to zero. By this means the system is demagnetized or reset to zero. Complete demagnetization, on the other hand, may not be necessary to provide maximum signal coil impedance since the maximum incremental permeability of most ferro magnetic materials exists at a flux level slightly above zero.

In some applications it may be desirable to provide intermediate flux conditions between zero and saturation in which case the control and reset coil currents may be varied or controlled in order to provide the desired results.

Figure 4:
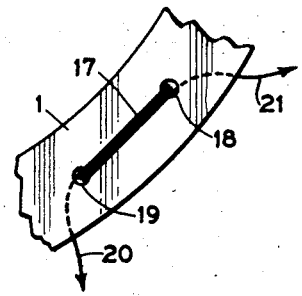
Fig. 4 shows a modification of the preferred form of the present invention.

Fig. 4 shows a modification of the resetting coil winding. The resetting coil 17 is wound through two holes 18 and 19 in the body of the annulus and current passed through coil 17 produces a magnetic field around a path encircling the coil and the two holes through which it is wound. Resetting is accomplished by applying at least the minimum current required to open the magnetic circuit to leads 20 and 21. Applying current in excess of that required to "open" the magnetic circuit will still accomplish the purpose so that the resetting current is not critical. This is a great advantage, especially, in systems in which large numbers of these devices are used.

While only a few forms of the present invention have been shown and described, many modifications will be apparent to those skilled in the art and within the spirit and scope of the invention as set forth in particular in the appended claims.

What is claimed is:

1. A bi-stable electromagnetic signal switching device comprising, a substantially closed loop saturable reactor element having a first portion thereof formed of ferromagnetic material of relatively high magnetic retentivity and another portion formed of highly permeable magnetic material of substantially lower magnetic retentivity, a first magnetizing coil wound upon said first portion, means forming a pair of equally constricted magnetic paths through said first portion, a second magnetizing coil comprising a pair of oppositely wound inductances equally disposed on each of said constricted paths through said first portion, further means forming another pair of equally constricted magnetic paths through said highly permeable portion of lower magnetic retentivity, and a third coil comprising a pair of oppositely wound inductances equally disposed upon each of said second constricted paths.

2. A bi-stable electromagnetic signal switching device comprising, a substantially closed loop saturable reactor device having a first portion thereof formed of magnetic material of relatively high magnetic retentivity and a second portion in series in said loop formed of highly permeable magnetic material of substantially lower magnetic retentivity with respect to said first portion and divided into two parallel magnetic paths at one point, a first coil wound upon said first portion linking said loop for providing magnetic flux around said loop, a second coil comprising two substantially equal and oppositely connected portions embracing said two parallel paths to form a magnetic circuit substantially decoupled from said closed loop, and a third coil directed to magnetize at least a small segment of said first portion of said loop in a direction perpendicular to said magnetic flux path around said loop and substantially decoupled from said path for interrupting said flux.

References Cited in the file of this patent

UNITED STATES PATENTS

| 2,200,263 | Kramolin | May 14, 1940 |
| 2,241,912 | Kersten et al. | May 13, 1941 |
| 2,680,820 | Duffing | June 8, 1954 |

FOREIGN PATENTS

| 513,259 | Belgium | Feb. 2, 1953 |